(No Model.)

D. ALMY.
ODOMETER.

No. 303,481. Patented Aug. 12, 1884.

WITNESSES:
C. H. Luther Jr.
Jno. L. Cowdron

INVENTOR:
Darwin Almy
by Joseph A. Miller & Co.
Attys

UNITED STATES PATENT OFFICE.

DARWIN ALMY, OF BRISTOL, RHODE ISLAND.

ODOMETER.

SPECIFICATION forming part of Letters Patent No. 303,481, dated August 12, 1884.

Application filed December 6, 1883. (No model.)

*To all whom it may concern:*

Be it known that I, DARWIN ALMY, of Bristol, in the county of Bristol and State of Rhode Island, have invented a new and useful Improvement in Odometers, of which the following is a specification.

My invention relates to improvements in that class of machines which are designed to be attached to land and marine vehicles for the purpose of indicating the distance traveled by such vehicles.

My invention is particularly applicable to carriages, wagons, and other land-vehicles, and the object of my invention is to produce an inexpensive and simple but accurate machine for the purpose above mentioned.

My invention consists in certain improved features of the construction and arrangement of the machine, and in certain combinations thereof, as hereinafter described and claimed.

Figure 1:
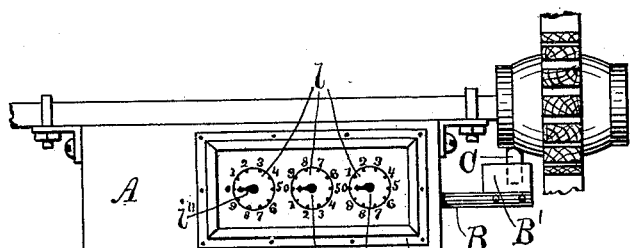
Figure 2:
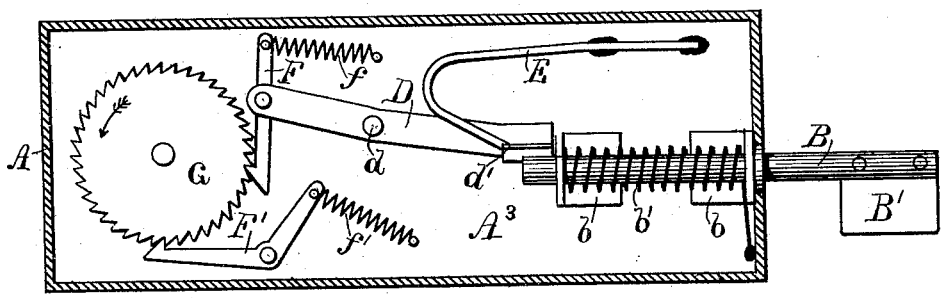
Figure 3:
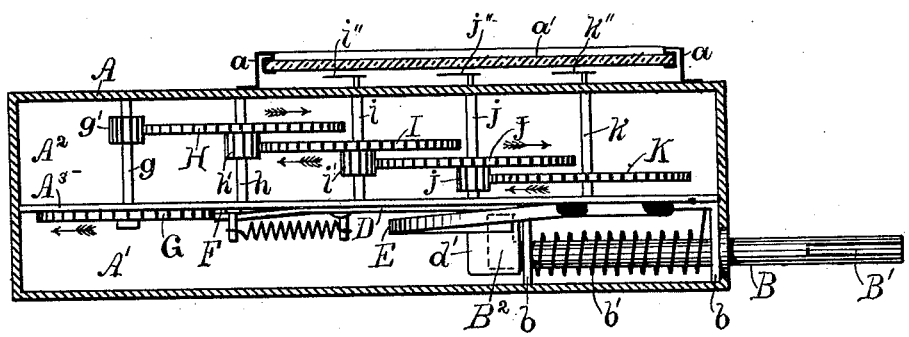

In the accompanying drawings, Figure 1 is a rear side view of the hind axle of a wagon or carriage or other land-vehicle, showing my improved odometer in operative position. Fig. 2 is a sectional plan view of the actuating parts of the odometer. Fig. 3 is a vertical longitudinal section of the entire machine detached from the axle.

In the said drawings, A designates the housing or casing of the machine, which is divided into two compartments, $A'$ $A^2$, by a partition, $A^3$. The front side of the casing is formed or provided with a frame, $a$, in which is set a transparent plate, $a'$, through which the indicating hands and dials may be viewed. The housing A may be secured by suitable means to the axle of the vehicle, as indicated in Fig. 1. The compartment $A'$ of the housing A contains the parts by which the revolutions of the vehicle-wheel are transmitted to the indicating mechanism. The transmitting or actuating mechanism consists of a shaft, B, which carries at its outer end a radial plate, $B'$, arranged to be engaged by a pin, C, upon the hub of the vehicle-wheel, the width of said plate being such as to compensate for all lateral play of the hub upon the axle, so that the pin C may not fail to come into contact with the plate. The shaft passes into the compartment $A'$ through a suitable aperture in the side of the housing A, and within said housing the shaft is mounted in two brackets, $b\ b$, which are secured to the partition $A^3$. Between the brackets $b$ the shaft is surrounded by a coiled spring, $b'$, one end of which is secured to the shaft, while the other end is secured to the partition, the arrangement of the spring being capable of variation both in character and precise location, and the object of the spring being, in any event, to keep the shaft in its normal position. The inner end of the shaft B is formed with a tongue, $B^2$, which is produced by bending or turning the end of said shaft at right angles, and this tongue lies within the inner face or side of the inner bracket, $b$.

D designates a bar or arm, which is pivoted to the partition $A^3$, as indicated at $d$, and said arm is provided at its end contiguous to the tongue $B^2$ of the shaft with a downturned blade or plate, $d'$, which is designed to be engaged by the tongue of the shaft.

E designates a spring, which may be of the precise form shown or any other suitable form. As shown, one end of the spring is secured to the partition $A^3$, and the opposite end rests against the plate $d'$ of the arm D, and is in contact with the opposite side of said plate from the tongue $B^2$. At its opposite end the bar D carries pivotally a pawl, F, which is acted upon by the contraction of a coiled spring, $f$, arranged as shown.

G designates a ratchet-wheel, which is mounted upon the shaft or spindle $g'$, and the teeth of which are engaged by the pawl F. The teeth of the ratchet-wheel are also engaged by a pivoted L-shaped pawl, $F'$, held into engagement with the ratchet-teeth of the wheel by a spring, $f'$, arranged as shown, the function of the pawl $F'$ being to hold the wheel G while the pawl F is moving. The number of teeth upon the ratchet-wheel G bears always a certain relation to the measurement of the vehicle-wheel. Thus, for a vehicle-wheel fifty inches in diameter the number of teeth on the ratchet-wheel will be forty, and for each increase of an inch in diameter of the vehicle-wheel there will be a corresponding decrease of one tooth in the ratchet-wheel, while for each decrease of an inch in the diameter of the vehicle-wheel there will be a corresponding increase of one tooth in the ratchet-wheel. The ratchet-wheel G is mounted removably upon one end of a hub or arbor, $g$, which extends through the partition $A^3$, through the compartment $A^2$, and has its opposite end inserted into the front side of the casing A, as shown in Fig. 3. The purpose of removably mounting the wheel G upon the hub $g$ is to render such wheel interchangeable with other wheels of a greater or less number of teeth, so as to correspond with a decrease or increase in vehicle-wheel diameter. Of course the wheel G may be permanently secured to the arbor; but it is preferably otherwise secured, because in the latter event the same machine may be used upon different vehicles by simply making the required changes in the ratchet-wheels.

$h$, $i$, $j$, and $k$ designate a series of arbors for an indicating-train, and carry, respectively, the gear-wheels H, I, J, and K, and, excepting the arbor $k$, also the pinions $h'$ $i'$ $j'$, while the arbors $i$, $j$, and $k$ carry, respectively, at their outer ends dial-hands $i''$, $j''$, and $k''$, which indicate, in connection with suitable dial-plates, $l$, the distance traveled in divisions and subdivisions. When the vehicle is being drawn along, the pin C on the hub does not impart a complete revolution to the shaft B by contact with the plate B'; but such pin merely imparts an impulse to such plate and shaft only sufficient in extent to move the pawls F F' one notch. It will also be seen that no movement of the indicating mechanism will occur while the vehicle is being backed, as the tongue $B^2$ will not engage the plate $d'$ of the bar.

My improved odometer is also readily applicable to steamboats, in which case the shaft of the propeller will be provided with a pin arranged to engage the plate B' of the shaft in substantially the manner described above.

Having thus described my invention, I claim as new and desire to secure by Letters Patent—

1. An improved odometer, consisting of an indicating-train, a ratchet-disk mounted upon the arbor of one member of the indicating-train, and the teeth of which bear a certain numerical relation to the size of the vehicle-wheel, a rotary oscillating bar arranged to be engaged by a projection on the wheel-hub, and a pawl and detent, the former being actuated by the oscillating bar for moving and holding the ratchet-disk, substantially as set forth.

2. The combination, with the indicating-train and the ratchet-disk G, of the pivoted arm D, carrying the spring-pawl F, the spring pawl or detent F', the spring E, and the spring-bar B, arranged to be engaged by a projection on the vehicle-wheel, substantially as described.

3. The combination, with the arbors $g$ $h$ $i$ $j$ $k$, carrying, respectively, the ratchet-wheel G and pinion $g$, the gear-wheel H and pinion $h$, the hand $i''$, gear-wheel I and pinion $i$, the hand $j''$, gear-wheel J and pinion $j'$, and the hand $k''$, and gear-wheel K, of the pivoted bar D, having the plate $d'$, the spring-pawl F, mounted pivotally on said bar, the spring-pawl F', the spring E, and the shaft B, having the plate B', spring $b$, and tongue $B^2$, substantially as and for the purposes described.

DARWIN ALMY.

Witnesses:
M. F. BLIGH,
J. A. MILLER, Jr.